United States Patent [19]

Gadkaree

[11] Patent Number: 5,284,806
[45] Date of Patent: Feb. 8, 1994

[54] GLASS-DOPED CERAMIC MATRIX COMPOSITES

[75] Inventor: Kishor P. Gadkaree, Big Flats, N.Y.

[73] Assignee: Corning Incorporated, Corning, N.Y.

[21] Appl. No.: 1,146

[22] Filed: Jan. 7, 1993

Related U.S. Application Data

[63] Continuation of Ser. No. 289,834, Dec. 27, 1988, abandoned.

[51] Int. Cl.$^5$ .................. C03C 10/06; C03C 14/00
[52] U.S. Cl. ............................. 501/8; 501/4; 501/9; 501/32
[58] Field of Search .............. 501/4, 8, 9, 32, 95, 501/17

[56] References Cited

U.S. PATENT DOCUMENTS

| | | | |
|---|---|---|---|
| 4,755,489 | 7/1988 | Chyung et al. | 501/8 |
| 4,769,346 | 9/1988 | Gadkaree et al. | 501/4 X |
| 4,857,485 | 8/1989 | Brennan et al. | 501/7 |
| 4,919,991 | 4/1990 | Gadkaree | 501/8 X |
| 4,973,564 | 11/1990 | Chyung et al. | 501/8 X |
| 5,070,046 | 12/1991 | Hu | 501/9 |

FOREIGN PATENT DOCUMENTS 2211837 12/1989 United Kingdom .

OTHER PUBLICATIONS

Brennan, "Interfacial Studies of SiC Fiber Reinforced Glass-Ceramic Matrix Composites", Final Report Contract N00014-82-C-0096, Oct. 1987.

*Primary Examiner*—Karl Group
*Attorney, Agent, or Firm*—Kees van der Sterre

[57] ABSTRACT

Fiber-reinforced glass-ceramic matrix composites exhibiting substantially increased resistance to stress failure above the microcrack point in a hot oxidizing environment are provided by introducing into the composite a matrix additive consisting of a stable, refractory, chemically compatible glass. The glass is disposed as an intergranular glass phase in the crystalline aluminosilicate glass-ceramic matrix of the composite, which may further comprise a whisker addition to the matrix to increase the high-temperature viscosity of the intergranular glass.

15 Claims, 1 Drawing Sheet

GLASS-DOPED CERAMIC MATRIX COMPOSITES

This application is a continuation of application Ser. No. 07/289,834, filed Dec. 27, 1988, now abandoned.

BACKGROUND OF THE INVENTION

The present invention relates generally to ceramic matrix composites, and more particularly to ceramic matrix composites reinforced with silicon carbide fibers and comprising additional glass and inorganic whisker phases. Composites of this type are disclosed which exhibit greatly enhanced resistance to oxidation embrittlement.

The use of inorganic whiskers and fibers to reinforce glasses, glass-ceramics, and ceramics is now well known. The mechanism of strengthening of glass or ceramic bodies by fibers is considered to be that of load transfer by the matrix to the fibers through shear. This load transfer shifts stress from the glass or ceramic matrix to the relatively long, high modulus fibers, while the fibers at the same time may act to impede crack propagation in the matrix material.

Whiskers are thought to impart strengthening by a similar mechanism, but load transfer to whiskers by the matrix is more limited due to the limited length and aspect ratio of the whiskers Theoretically, a whisker which is sufficiently short will not be loaded to the breaking point by the matrix under stress, and therefore full advantage cannot be taken of the high strength of the whiskers.

Among the fibers and whiskers which have been suggested for use as reinforcement for non-metal matrix materials are silicon carbide, silicon nitride, alumina and carbon fibers or whiskers. For example, U.S. Pat. No. 4,324,843 describes SiC fiber reinforced glass-ceramic composite bodies wherein the glass-ceramic matrix is of alumino-silicate composition. U.S. Pat. No. 4,464,475 describes similarly reinforced glass-ceramics comprising barium osumilite as the predominant crystal phase, while U.S. Pat. No. 4,464,192 describes whisker-reinforced glass-ceramic composites of aluminosilicate composition.

A principal purpose for incorporating whisker reinforcement in ceramic matrix materials for high temperature applications is that of increasing the toughness of the material. A toughened ceramic material exhibits improved resistance to cracking failure from flaws sustained in use, offering the possibility of increased fatigue lifetime. As noted in U.S. Pat. No. 4,626,515, the addition of fiber reinforcement to glasses such as alkali-free alkaline earth aluminosilicate glasses can result in substantial strengthening, while whisker additions to those glasses were found effective to enhance the toughness of the glass.

A second reason for incorporating whiskers into such materials is to enhance the transverse or so-called "off-axis" properties of the composite. Many structural fiber-reinforced composites are of laminar type, i.e., the fiber reinforcement is preferentially disposed in layers within the material. The layers consist of fiber groups or arrays wherein the fibers are principally disposed in substantially parallel alignment in a single direction, giving rise to a "strong" axis in the material. Ceramic composites to be utilized in high-stress environments should exhibit strength properties which are more isotropic, i.e., not confined to the fiber axis, and it has been reported, for example in U.S. Pat. No. 4,615,987, that whisker additions can provide improved transverse strength properties.

Prospective uses for fiber-reinforced ceramic matrix composites such as described in these and other prior publications include structural applications in high temperature heat engines For these applications the materials must exhibit good strength and toughness at elevated as well as ambient temperatures. Temperatures in the range of 700°–1000° C. and highly oxidizing conditions (due to the high-temperature activity of oxygen) will probably be encountered.

An important problem which has been identified in silicon carbide reinforced ceramic matrix composites in this temperature regime is that of high temperature embrittlement. Hence, even though these composites are strong and tough at room temperatures, at temperatures of interest, i.e., 900° C. or 1000° C., the composites fail in a brittle, catastrophic manner, and often at stresses which are only 30 to 40% of the ultimate strength obtained at room temperature. While the exact mechanism of embrittlement has not been fully explained, oxidative deterioration of the fiber-matrix interface is the probable cause. See, for example, R. L. Stewart et al., "Fracture of SiC Fiber/Glass-Ceramic Composites as a Function of Temperature," in *Fracture Mechanics of Ceramics*, R. C. Bradt et al. Ed., Volume 7, pages 33–51, Plenum (New York) 1986.

It is known that, in ceramic composites, the matrix has a significantly lower strain-to-failure than the silicon carbide fiber reinforcement phase. Therefore, under strain, microcracks develop in the composite matrix long before the ultimate fiber-enhanced failure strain of the composite is reached. Typically, the matrix microcrack stress is only about 30 to 50% of the ultimate strength of the composite.

Composites comprising silicon carbide fibers such as the frequently used Nicalon ® silicon oxycarbide fibers derive their toughness from a graphitic layer which develops in situ adjacent the fiber surface during composite manufacture, and which controls fiber-matrix bonding in the composite. Below the microcrack stress point this layer is protected by the matrix from the high-temperature oxidizing environment, but above that point the environment has access to the fiber-matrix interface and, at temperatures of 900°–1000° C., oxidation of this layer occurs very quickly. After such exposure, the composites invariably fail in a brittle rather than in a tough or "graceful" manner.

Since the avoidance of brittle failure is critical to the successful high-temperature application of these materials, a number of solutions to the oxidation embrittlement problem have been proposed One such solution is to simply increase the microcrack stress point of the matrix, for example by the introduction of a strengthening whisker phase. This can be achieved, but brittle failure at high temperatures is still observed in the resulting materials.

Another approach is to employ additional fiber coatings to protect or replace the graphitic interface that imparts desirable fracture behavior. For example, U.S. Pat. No. 4,642,271 suggests that the high-temperature strength and toughness of a composite comprising an SiO matrix and SiC reinforcing fibers may be significantly improved by coating the fibers with boron nitride. However, these and other coatings add cost to the composite system and have not yet been shown to be fully effective in preserving composite performance at very high temperatures.

It is also known to add $B_2O_3$, alone or as a mixed glass, to silicon-carbide-fiber-reinforced lithium alumino-silicate glass-ceramic composites to reduce so-called "pipeline" oxidation of the graphitic fiber/matrix interface. While some improvements in oxidation protection have been achieved in this fashion, the large $B_2O_3$ additions required result in matrix blistering at high temperatures, and also lower the practical use temperatures of the composites to about 800° C.

Therefore there remains a need to further improve the performance characteristics of fiber-reinforced ceramic matrix composites, particularly at high temperatures and under oxidizing conditions.

It is a principal object of the present invention to provide novel fiber-reinforced glass-ceramic matrix composites which exhibit improved resistance to embrittlement under adverse high temperature conditions.

It is a further object of the invention to provide novel fiber-reinforced ceramic matrix composites which exhibit improved resistance to stress failure in a hot oxidizing environment.

It is a further object of the invention to provide a method for making silicon carbide-reinforced glass-ceramic matrix composites which provides products of improved strength and/or toughness at high temperatures.

Other objects and advantages of the invention will become apparent from the following description thereof.

SUMMARY OF THE INVENTION

The present invention provides a solution to the problem of high temperature oxidative embrittlement which avoids both the need for protective fiber coatings and reliance on complex chemical reactions or diffusion during composite manufacture. The invention offers effective fiber protection even for oxidatively unstable silicon carbide or silicon oxycarbide fibers, protecting the graphitic interface developed on these fibers and thereby preserving the desirable properties of that interface for prolonged periods under stress at elevated temperatures.

In one aspect the invention can be seen as enhancing the high temperature performance of a composite by modifying the microcracking behavior of the selected glass-ceramic matrix. A reduction in the extent of matrix microcracking and/or a blunting of matrix microcracks under high temperature stress is postulated which appears very effective in preserving the room temperature characteristics of the fibers at high temperatures.

The invention may also be seen as a matrix composition the matrix high temperatures, through the introduction of a small controlled amount of a plastically deforming phase into the matrix. The plastic phase generally has a softening point low enough to permit slight flow in the anticipated use temperature range of the composite, but a flat viscosity curve such that the viscosity of the phase does not change rapidly in that use temperature range.

The desired improvements in composite performance are realized in accordance with the invention by introducing into the composite a matrix additive or "dopant" consisting of a stable, refractory, chemically compatible glass. This glass, which is ultimately disposed as an intergranular glass phase in the crystalline aluminosilicate glass-ceramic matrix of the composite, is introduced in a proportion at least sufficient to increase the resistance of the composite to stress failure in a hot oxidizing environment. Such increased resistance is manifested, at a minimum, by a longer time to failure under high stress at 1000° C. in air than exhibited by composites free of intergranular glass. Air at 1000° C. is considered substantially representative of hot oxidizing environments such as are likely to be encountered in actual composite use.

For the purpose of the present description high stress means a stress above the microcrack stress but below the ultimate failure stress of the composite. An intergranular glass phase is a discrete glassy phase appearing at the boundaries of the aluminosilicate crystal grains predominating in the glass-ceramic matrix of the inventive composites.

The deliberate addition of glass to a ceramic matrix composite is contrary to the prevailing teaching in the art. In prior ceramic matrix composites, particularly in composites with refractory alkaline earth aluminosilicate matrices, the total exclusion of glass has been a principal objective in order to achieve the maximum possible use temperature for the composite.

The present invention recognizes that significant improvements in composite performance, including higher practical use temperatures, can be attained through the controlled addition of glass. By higher practical use temperatures is meant a capability of use under stresses above the microcrack point under hot oxidizing conditions, a capability not found in most prior art ceramic matrix composites.

These improvements are achieved, first, by controlling the proportion and composition of the glass dopant which is introduced. Secondly, in the preferred composite structures, an additional high modulus whisker phase is introduced to raise the effective viscosity of the matrix at high temperatures. This enhances the ability of the matrix to transfer load stress to the fibers.

The results attained, especially in the preferred composites, include a very substantial increase in the practical use temperature of the composite system, together with excellent resistance to composite degradation on long term exposure to hot oxidizing environment.

DESCRIPTION OF THE DRAWING

The invention may be further understood by reference to the drawing, wherein.

DETAILED DESCRIPTION

Figure 1:
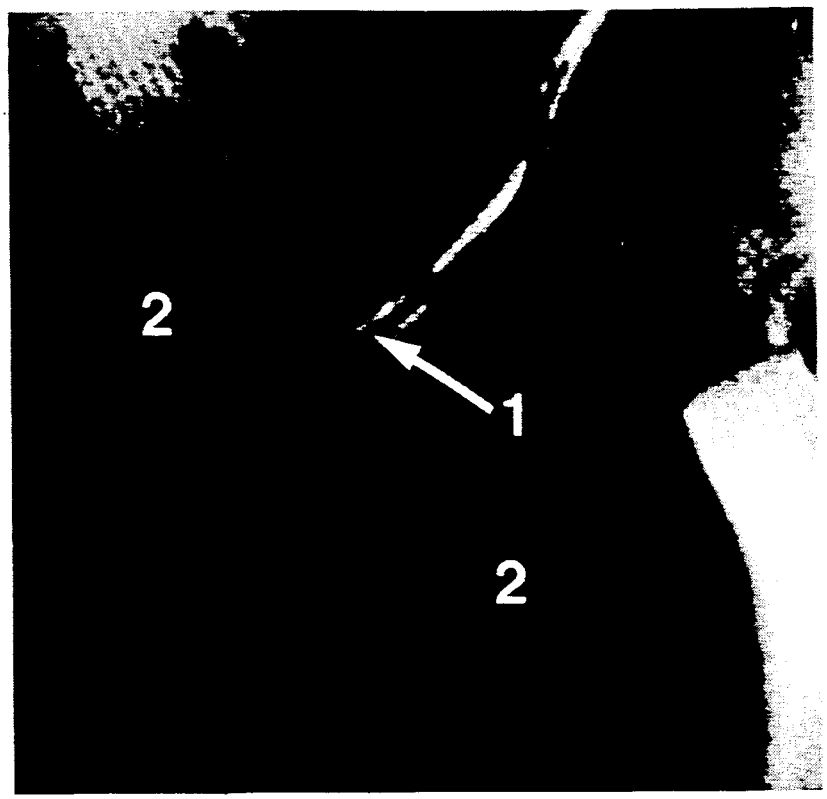
FIG. 1 is a electron photomicrograph showing the microstructure of a glass-doped glass-ceramic matrix material provided in accordance with the invention.

The nature of the embrittlement problem in existing composite systems is illustrated by the behavior of a known composite material comprising an alkaline earth alumino-silicate glass-ceramic matrix having a principal crystal phase composed of anorthite and a fiber reinforcement phase consisting of Nicalon ® silicon oxycarbide fibers. Typical room temperature properties for such a composite include a microcrack stress point of approximately 30 ksi and an ultimate flexural strength of approximately 110 ksi.

When no measures are taken to enhance the high temperature performance of this material, it demonstrates rapid oxidation embrittlement under stress at 1000° C. Microcracking at this temperature still commences at a stress of 30 ksi, but ultimate flexural failure typically occurs prematurely at only 40 ksi. Further, in hot static fatigue testing under oxidizing conditions at this temperature, flexural failure of the material will occur within minutes even at stress levels only 1000 psi above the microcrack stress point.

In light of this behavior, three objective performance criteria may be specified which, if met, would demonstrate substantial progress toward a complete solution to this stress embrittlement problem. First, the composite must meet the basic requirement of high strength and high strain to failure both at room temperature and at elevated temperatures. Secondly, it should be able to survive a hot oxidizing environment under loads exceeding the microcrack stress point of the matrix for an extended period of time (e.g., more than about 10 hours). And finally, the retained strength of the composite following such stressed high temperature exposure should be substantial, preferably at least about 90% of the initial strength of the composite. This last requirement is particularly difficult since it implies little or no strength degradation in the composite even after an oxidizing treatment under load above the microcrack stress level.

The present invention offers products approaching or even exceeding these specified performance criteria. Further, a variety of known matrix materials, particularly including the known alkaline earth aluminosilicate glass-ceramic matrix materials presently employed for ceramic matrix composite fabrication, can be employed in producing fiber-reinforced composites exhibiting improved high-temperature performance in accordance with the invention.

For the most difficult applications, i.e., those requiring high strength and toughness at particularly high temperatures in an oxidizing environment, refractory alkaline earth aluminosilicate glass-ceramics are among the most preferred of matrix materials. Such glass-ceramics include those wherein the predominant crystal phase is selected from the group of anorthite ($CaO.Al_2Si_2$) and its pseudo-binaries with mullite ($3Al_2O_3.Si_2$), cordierite ($2MgO.2Al_2O_3.5SiO_2$), barium osumilite ($BaO.2MgO.3Al_2O_3.9SiO_2$), albite solid solution ($Na_2O.Al_2O_3.6Si_2$), $Al_2O_3$, $SiO_2$, $CaO.SiO_2$, and gehlenite ($2CaO.Al_2O_3.SiO_2$) These are known from U.S. Pat. No. 4,615,987, and may be produced through the crystallization of glasses consisting essentially, in weight percent, of about 0–25% CaO, 0–30% SrO, 10–30% CaO+SrO, 0–15% MgO, 0–25% BaO, 0–4% $Na_2O$, 0–6% $K_2O$, 25–38% $Al_2O_3$, 35–60% $SiO_2$, 0–15% $ZrO_2$, 0–3% $As_2O_3$, 0–30% total of BaO+MgO+$Na_2O$+$K_2O$+$TiO_2$ +$ZrO_2$+$As_2O_3$, and 0–10% total of nucleating agents selected in the indicated proportion from the group consisting of 0.1–3% $Cr_2O_3$, 0.25–3% $HfO_2$, 2–5% $MoO_3$, 0.25–3% $Nb_2O_5$, 0.25–3% $Ta_2O_5$, and 0.25–3% $WO_3$.

Alternative glass-ceramics of this type include those comprising a predominant crystal phase consisting essentially of triclinic anorthite in solid solution with a least one of mullite and alpha alumina. These glass-ceramics are known from U.S. Pat. No. 4,755,489 and may be produced by the thermal crystallization of glasses consisting essentially, in weight percent, of about 16–20% CaO, 38.5–46% $Al_2O_3$, 35–42% $SiO_2$, 0.25–1.5% $As_2O_3$, and up to 10% total of at least one nucleating agent selected in the indicated proportion from the group consisting of 0.1–3% $Cr_2O_3$, 0.25–3% $HfO_2$, 2–5% $MoO_3$, 0.25–3% $Nb_2O_5$, 0.25–3% $Ta_2O_5$, 0.25–3% $WO_3$, and 1–10% $ZrO_2$, the composition being substantially free of $TiO_2$ and containing $Al_2O_3$ in an amount which is at least 10 mole percent and up to 50 mole percent in excess of that present in stoichiometric triclinic anorthite.

Still another class of alkaline earth aluminosilicate glass-ceramics useful in accordance with the invention are those wherein the principal crystal phase is selected from the group consisting of barium osumilite, cordierite, and stuffed cordierite. Some barium osumilite and barium-stuffed cordierite glass-ceramics are disclosed in U.S. Pat. No. 4,464,475; alternative species which may replace barium in barium-stuffed cordierite include CaO, SrO and $Cs_2O$. Glass-ceramics of this type suitable for use in ceramic matrix composites in accordance with the invention may be produced by the thermal crystallization of glasses consisting essentially, in weight percent, of about 35–60% $SiO_2$, 17–40% $Al_2O_3$, 5–15% MgO, 1–18% total of one or more oxides selected from the group consisting of BaO, CaO, SrO and $Cs_2O$, 0–5% $Nb_2O_5$, 0–10% $Ta_2O_5$, 0–6% $ZrO_2$, 0–1% Si, 0–3% $As_2O_3$ and 0–10% ZnO.

Barium-stuffed cordierite glass-ceramics are particularly suited for use in accordance with the invention because they exhibit relatively low coefficients of thermal expansion and high elastic moduli. For example, elastic moduli on the order of 19 Msi are typical of these materials.

As is known from U.S. Pat. No. 4,485,179, $Nb_2O_5$ and/or $Ta_2O_5$ may be useful in ceramic matrix composites not only as nucleating agents but also to protect SiC fibers from deterioration in use. Therefore, matrix glass-ceramics in accordance with the invention may in some cases contain these oxides as additional constituents, typically in amounts ranging about 0.5–10% total $Ta_2O_5$ or $Nb_2O_5$ and most preferably including 0.1–5% of $Nb_2O_5$. Similarly, the inclusion of 0.5–3% $As_2O_3$ can be useful in these matrices to help to protect SiC whiskers and fibers from oxidation.

Table I below provides examples of compositions for glass-ceramic matrix materials particularly suitable for use in accordance with the invention. Examples A, B and I of Table I represent glass compositions which are thermally crystallizable to barium-stuffed cordierite as the predominant crystal phase, while compositions C and D form barium osumilite and compositions E and F form anorthite as predominant crystal phases. Compositions G and H represent glasses which are thermally crystallizable to glass-ceramic materials wherein the predominant crystal phase is triclinic anorthite in solid solution with one or both of mullite and/or alumina. Compositions reported in Table I are given in parts by weight on the oxide basis.

TABLE I

|  | A | B | C | D | E |
|---|---|---|---|---|---|
| $SiO_2$ | 42.4 | 43.66 | 50.63 | 53.2 | 45.6 |
| $Al_2O_3$ | 36.0 | 37.11 | 27.66 | 25.0 | 36.2 |
| CaO | — | — | — | 14.1 | 8.1 |
| BaO | 6.0 | 6.20 | 13.27 | 12.5 | — |
| MgO | 12.6 | 13.03 | 3.44 | 8.4 | 4.4 |
| $As_2O_3$ | 0.68 | 0.70 | 1.0 | 1.0 | 0.5 |
| $ZrO_2$ | 3.0 | — | — | — | — |

|  | F | G | H | I |
|---|---|---|---|---|
| $SiO_2$ | 48.1 | 35.4 | 39.5 | 43.26 |
| $Al_2O_3$ | 35.6 | 45.0 | 38.5 | 36.73 |
| CaO | 16.5 | 19.0 | 18.4 | — |

TABLE I-continued

| | | | | |
|---|---|---|---|---|
| BaO | — | — | — | 6.11 |
| MgO | 8.3 | — | — | 12.81 |
| As$_2$O$_3$ | 0.5 | 0.05 | 0.48 | 0.67 |
| ZrO$_2$ | — | 3.0 | 3.0 | — |
| Nb$_2$O$_5$ | — | — | — | 1.0 |

Although the invention has primary utility for use in composites containing silicon carbide or silicon oxycarbide fibers, for the reasons hereinabove set forth, other refractory inorganic fibers useful for ceramic matrix reinforcement, including fibers of carbon, alumina, B4C, BN, zircon, mullite, spinel or silicon nitride, may also be used. Commercial silicon carbide or oxycarbide fibers, for example Nicalon ® silicon oxycarbide fibers manufactured by the Nippon Carbon Co. of Tokyo, Japan, are examples of the preferred fibers.

Frequently, the fibers used for reinforcement will be disposed in axial alignment in identifiable layers within the matrix material, the composite product having been provided by the consolidation of stacked prepreg sheets of substantially parallel, matrix-embedded fibers. These composites will hereinafter sometimes be referred to as laminar composites because of the layered configuration of the fibers present therein.

The preferred whiskers for addition to the composite system of the invention are silicon carbide whiskers. While whiskers of other materials such as Si$_3$N$_4$, C or Al$_2$O$_3$ may in principal be used, silicon carbide whiskers are known to be compatible with many of the glass-ceramic matrix materials currently favored for ceramic matrix composite fabrication. Silicon carbide whiskers suitable for use in accordance with the invention are commercially available, examples of useful commercial products including Arco SC-9 silicon carbide whiskers supplied by Advanced Composites Materials Corporation, Greer, S.C., and Tokamax TM silicon carbide whiskers supplied by the Tokai Carbon Co. of Tokyo, Japan.

Whiskers of silicon carbide, or other compatible whisker additions, can not only improve the off-axis properties and creep resistance of the composite material, but also improve the load transfer characteristics of the matrix. In general, whisker additions constituting about 1-15% by weight of the total weight of the glass-doped glass-ceramic matrix will be preferred.

As is now evident, a key variable affecting the results achievable in accordance with the invention is the selection of the dopant glass to be incorporated into the composite. The glass should not only have a relatively flat viscosity curve as previously stated, but also a low level of chemical reactivity with respect to the glass-ceramic selected for use as the composite matrix.

The presently preferred glasses for glass-ceramic matrix materials of the kind above described are borosilicate glasses. Glasses of this general description have been identified which have relatively flat viscosity curves and a high degree of stability and refractoriness.

The borosilicate glasses used for matrix doping in accordance with the invention will generally comprise about 1-30% of B$_2$O$_3$ by weight, and may comprise other oxides such as the alkali or alkaline earth metal oxides in addition to SiO$_2$ and B$_2$O$_3$. An example of a commercially available borosilicate glass exhibiting properties suitable for use as a dopant glass in accordance with the invention is Corning Code 7761 alkali borosilicate glass. This glass, containing about 18% B$_2$O$_3$, has a strain point of about 458° C., an annealing point of about 510° C., and a softening point of about 820° C. It also has a very high working point of about 1300° C., indicating a relatively flat viscosity-temperature curve. These properties permit the glass to provide good oxidation protection over a large temperature range in a fiber-reinforced ceramic matrix composite without undesirably reducing the creep resistance of the composite product.

Both the properties of the glass and the amount of glass included can be varied to achieve close control over the properties of the composite product. A convenient method for controlling the viscosity of the glass within a given temperature range is to increase or reduce the content of alkali metal oxides such as K$_2$O in the glass. Reducing the level of alkali generally provides a "harder" glass, i.e., a glass exhibiting a higher viscosity at a given temperature, and a similar result may be achieved by reducing the ratio of B$_2$O$_3$:SiO$_2$ in the glass.

Composite properties are also conveniently adjusted by controlling the concentration of glass dopant in the product. The optimum glass concentration has been found to depend on the composition of the matrix, the volume loading of fibers and/or whiskers in the product, and the intended use temperature thereof, but can readily be determined by routine experiment. In general, however, dopant glass concentrations in the range of 1-12% by weight, based on the total weight of the matrix (excluding the weight of any added whiskers), will be used.

The incorporation of the dopant glass into the ceramic matrix composite of the invention can be achieved in two ways. Where the selected matrix is already crystallized or consists of a prepared powdered glass precursor for the matrix which is to be crystallized in situ in the course of composite manufacture, the glass additive can simply be ground to powder and then mixed with the glass precursor matrix material by ball milling or other mixing technique.

For the preferred composites, however, which generally comprise a refractory glass-ceramic matrix, the preferred practice is to melt the dopant glass and the precursor glass for the glass-ceramic matrix together as a single glass composition. The resulting glass can then be processed in the conventional way to provide the desired composite product. In the course of this processing, the crystal phases in the glass-ceramic matrix are developed normally by thermal nucleation and crystallization of the glass, while concurrently with crystallization the dopant glass develops as a residual intergranular glassy phase at the crystal grain boundaries of the matrix.

This latter practice is preferred because it results in a more uniform distribution of the glass in the matrix. Also, in systems where it is successfully employed, the probability of adverse reactions between the dopant glass and the glass-ceramic, which reactions could cause long term phase instability problems in the composite, is extremely low.

As is known in the art, the properties demonstrated on samples of ceramic matrix composite materials will also depend in part on factors such as the volume percent of fibers and whiskers present in the final phase assemblage. While the actual proportions employed will of course depend on compositional factors as well as the intended use for the product, the preferred composites of the invention will typically contain about 30-50% by volume of reinforcing fibers, most preferably silicon oxycarbide fibers, with the remainder of the composite consisting of the glass-doped matrix plus added whiskers.

The invention may be further understood by reference to the following examples illustrating the manufacture of ceramic matrix composites in accordance therewith.

EXAMPLES 1-3

To prepare a ceramic matrix composite product, a single glass having a composition which is a composite of a barium-stuffed cordierite glass-ceramic matrix composition and a borosilicate glass dopant composition is compounded and melted. The glass-ceramic matrix components of the melt, making up from 92.5% to 97.5% by weight of the glass and approximating the composition of stoichiometric barium-stuffed cordierite with added $Nb_2O_5$, are present in the relative weight proportions of about 12.81 parts MgO, 6.11 parts BaO, 36.73 parts $Al_2O_3$, 43.26 parts $SiO_2$, 0.67 parts $As_2O_3$ and 1.0 parts $Nb_2O_5$, while the borosilicate glass dopant components, totalling 2.5%, 5.0%, or 7.5% by weight of the melt, are present in the relative weight proportions of 2.8 parts $K_2O$, 18.4 parts $B_2O_3$, and 78.7 parts $SiO_2$. The actual compositions of the three glasses are reported in Table II below.

TABLE II

| Oxide | Ex. 1 | Ex. 2 | Ex. 3 |
|---|---|---|---|
| $SiO_2$ | 43.96 | 44.85 | 45.72 |
| $Al_2O_3$ | 35.57 | 34.65 | 33.75 |
| MgO | 12.4 | 12.08 | 11.77 |
| BaO | 5.9 | 5.75 | 5.606 |
| $Nb_2O_5$ | 0.978 | 0.953 | 0.9276 |
| $As_2O_3$ | 0.655 | 0.638 | 0.619 |
| $B_2O_3$ | 0.489 | 0.9531 | 1.406 |
| $K_2O$ | 0.074 | 0.1448 | 0.2138 |
| % Glass Dopant | 2.5% | 5.0% | 7.5% |

The resulting glass melts are stable and can be cast to form clear glass patties, if desired, with the glasses being readily crystallizable to fine-grained glass-ceramics having a principal crystal phase identifiable by x-ray diffraction as barium-stuffed cordierite. The intergranular phase is identifiable by energy-dispersive x-ray analysis as a borosilicate glass.

FIG. 1 of the drawing illustrates the microstructure developed in a typical glass-ceramic produced from a composite composition such as above described. That Figure is a transmission electron photomicrograph of a thin section of a glass-ceramic derived from a glass having the composition of Example 2 of Table II. The presence of intergranular glass (arrow 1) at the boundary of two stuffed cordierite grains (2) can readily be detected.

To form ceramic matrix composites from the compositions reported in Table II, melts of the glasses are cast into glass patties, crushed to powder, and finally milled by ball-milling to produce fine glass powders of approximately 10 μm average particle size for subsequent processing.

To the powdered glass matrix materials thus provided is next added a whisker component to improve the load transfer characteristics of each matrix. The whiskers added consist of commercially available Arco SC-9 silicon carbide whiskers, and are added in a proportion sufficient to constitute about 10% by weight of the matrix. They are blended with the powdered glass to provide a homogeneous mixture by ball-milling in an isopropanol milling medium.

The fiber selected for incorporation in the composite is a Nicalon® silicon oxycarbide fiber yarn commercially available as NLM-202 yarn from the Nippon Carbon Co. of Tokyo, Japan. The yarn is combined with the glass powder-whisker mixture by first preparing a slurry of the mixture. The slurry is prepared by combining the mixture with an aqueous acrylic binder system comprising an acrylic binder, a dispersant, and a thickener. The resulting slurry contains, in weight percent, about 25% of the matrix mixture, about 46.15% water, about 15.48% isopropanol, about 11.98% of Rohm and Haas HA-8 acrylic binder, about 0.005% of 850 dispersant, and about 0.009% of TT615 thickener, the binder, dispersant and thickener each being commercially available from the Rohm and Haas Company, Philadelphia, Pa., USA.

The SiC fiber yarn is coated with the described slurry by passing a continuous strand of the yarn through the suspension as described. The coated yarn is then wound around a rotating drum to form a continuous prepreg sheet having a unidirectional fiber orientation. After drying, this sheet is cut from the drum to provide a green prepreg mat comprising unidirectional fibers coated with the glass-SiC powder mixture.

A consolidated ceramic matrix composite is next provided from each of the prepreg mats by cutting rectangular sections approximately 10 cm × 10 cm in size from each mat and stacking 8 such sections in uniaxial (fiber parallel) alignment to provide a multilayer preform. The preform thus provided is then burned out at 650° C. in a forced air oven to remove the organic binder constituents therefrom.

The resulting preforms are finally consolidated to full density, with concurrent conversion of the glass matrix material to a crystalline glass-ceramic matrix, by a hot-pressing heat treatment. Each preform is gradually heated under nitrogen to a temperature of 1250° C. at a pressure of 1500 psi., and is maintained at that temperature and pressure for approximately 10 minutes followed by slow cooling to room temperature.

Table III below shows the physical properties of the glass-doped ceramic matrix composites produced as above described, as determined in four-point bending to the point of ultimate flexural failure of the test samples. Included in the Table for each of the composites shown are the temperature at which the bending test is carried out, the bending stress ($\sigma$MCY) and sample elongation ($\epsilon$MCY) at which microcracking or other non-linear stress-strain behavior first appears (termed the microcrack yield point), and the ultimate bending stress ($\sigma$ULT) and sample elongation ($\epsilon$ULT) at which complete flexural failure of each composite sample occurs. All testing is carried out in an air atmosphere.

TABLE III

| Temperature (°C.) | $\sigma$MCY (Ksi) | $\epsilon$MCY (%) | $\sigma$ULT (Ksi) | $\epsilon$ULT (%) |
|---|---|---|---|---|
| Example 1 (2.5% dopant) | | | | |
| 25° | 64 | 0.28 | 125 | 0.75 |
| 1000° | 32 | 0.23 | 95 | 0.75 |
| 1200° | 32 | 0.34 | 90 | 1.08 |
| Example 2 (5% dopant) | | | | |
| 25° | 76 | 0.33 | 132 | 0.77 |
| 500° | 70 | 0.35 | 154 | 1.03 |
| 550° | 70 | 0.35 | 176 | 1.09 |
| 600° | 73 | 0.37 | 154 | 0.94 |
| 700° | 65 | 0.32 | 120 | 0.68 |

TABLE III-continued

| Temperature (°C.) | σMCY (Ksi) | εMCY (%) | σULT (Ksi) | εULT (%) |
|---|---|---|---|---|
| 1000° | 28 | 0.19 | 120 | 0.96 |
| 1200° | 18 | 0.16 | 105 | 1.2 |
| Example 3 (7.5% dopant) | | | | |
| 1000° | 44 | 0.37 | 90 | 0.85 |

As is evident from a study of the data in Table III, these samples exhibit good ultimate strengths and sample elongations at all test temperatures, with no evidence of high temperature embrittlement being seen. Thus the large reductions in high temperature strength, and in sample elongation at high temperatures, are substantially eliminated.

Figure 2:
FIG. 2 illustrates the fracture surface oil ceramic matrix composite provided in accordance with the invention resulting from flexural failure at a high temperature in an oxidizing environment.

FIG. 2 of the drawing illustrates extent to which the composites of the invention resist embrittlement at high temperatures. That figure shows the fracture surface of a composite having the composition of Example 2 in Table III above after flexural failure at a test temperature of 1200° C. as is evident from the Figure, excellent fiber pull-out behavior indicative of a high level of retained toughness in the sample is indicated. This fracture mode is fully consistent with the high sample elongation at the point of ultimate failure (εMCY) reported for Example 2 at 1200° C. in Table III.

Although Table III includes data at the so-called microcrack yield point, microcracking of these composites at very high temperatures is not to be anticipated. Thus the yield points at 1000° C. and above for these materials are actually "nonlinearity" points rather than microcrack points because the matrix is expected to deform rather than to microcrack. Thus the behavior of the glass-doped matrix at these temperatures is expected to be analogous to that of a thermoplastic matrix composite at room temperatures.

The reductions in stress levels at the microcrack or nonlinearity points at the higher temperatures are presently attributed to the softening of the glass at those temperatures which reduces the elastic modulus of the matrix. This softening is thought to reduce the ability of the matrix to transfer stress to the higher modulus reinforcing fibers, causing the matrix to yield at lower stress. From the several data points over a range of temperatures given for Example 2 (comprising 5% equivalent of glass dopant), it appears that the onset of this behavior occurs in these systems at temperatures somewhat above 800° C. The use of higher-aspect-ratio whiskers in this system would probably further increase the apparent elastic modulus of the matrix, thereby further improving the high-temperature yield point of these composites.

As previously noted, a critical variable of ceramic matrix composite performance is the extent to which the composite can retain strength and toughness with prolonged exposure to elevated temperatures, particularly under stresses capable of forming microcracks in the material. A practical technique for testing this behavior is to perform a static fatigue test at high temperatures and at stresses above the microcrack point.

Each of the composites produced as above described, when subjected to static fatigue testing at 1000° C. in air at stresses above the microcrack yield stress, exhibits excellent long term strength retention characteristics. Table IV below reports results from such static fatigue tests for these materials, all tests being conducted at 1000° C. Included in Table IV for each of the samples tested are the microcrack yield stress σMCY for the sample at 1000° C. (from Table III), the static fatigue load (Static Load) in ksi maintained on the sample during the test (in each case above the microcrack stress), and the duration of the test.

TABLE IV

| | Static Fatigue Tests | | |
|---|---|---|---|
| Example No. | σMCY (1000° C.) | Static Load | Test Duration |
| 1 | 32 ksi | 38 ksi | no failure to 135 hours |
| 1 | 32 ksi | 48 ksi | no failure to 135 hours |
| 2 | 28 ksi | 38 ksi | no failure to 135 hours |
| 3 | 44 ksi | 54 ksi | no failure to 50 hours |
| 3 | 44 ksi | 64 ksi | no failure to 50 hours |

The results set forth in Table IV indicate that the composites tested would have a use temperature well in excess of 1000° C., in that they can withstand significant stresses at these temperatures, frequently for prolonged periods, without catastrophic failure due to oxidation embrittlement. In fact high use temperatures, meaning use temperatures of at least 900° C., as manifested by fatigue resistance of at least ten hours in air at that temperature under constant stress above the the microcrack yield stress, is a common characteristic of the composites of the invention.

The excellent static fatigue results shown for these samples contrast strongly with the static fatigue performance of conventional fiber-reinforced ceramic matrix composites wherein the matrix is not doped with glass. As previously indicated, typical static fatigue performance for such composites under conditions such as reported in Table IV is such that flexural failure will occur immediately (in less than one minute) even at constant stresses only 1 ksi over the microcrack yield stress of the composite.

The ceramic matrix composites described above also exhibit excellent strength retention after exposure to long term static fatigue as above described. To evaluate this characteristic, samples of each composite material which had been subjected to 135 hour static fatigue testing as above described are retested for ultimate flexural strength at ambient temperatures following the static fatigue tests.

The sample corresponding to Example 1 in Table I above, which exhibited an ultimate flexural strength of 125 ksi prior to the static fatigue test, exhibited an ultimate flexural strength of 131 ksi after that test. A sample corresponding in composition to Example 2 in Table I, which exhibited an ultimate flexural strength of 132 ksi as made, exhibited an ultimate flexural strength of 128 ksi after static fatigue testing. These results indicate that no significant changes in room temperature properties for these materials result from long exposure to high temperatures.

While factors such as the composition and elastic properties of the matrix phase, as well as the composition, concentration, and viscoelastic properties of the dopant glass are anticipated to affect the performance of composites provided in accordance with the invention, the benefits and advantages thereof are not limited to any particular ceramic matrix or dopant glass system. The following examples illustrate composites made with some other matrix materials.

EXAMPLES 4-7

A series of four glasses is melted wherein the oxide compositions, calculated in weight percent, correspond to mixtures of two different crystal types, i.e., anorthite and cordierite. Table V below sets forth the oxide compositions of the glasses melted, as well as the equivalent weight ratio of anorthite crystals to cordierite crystals (the A/C ratio) which is developed in fully crystallized composite products comprising these matrix materials. Each of the compositions reported in the Table additionally includes the equivalent of approximately 2.5% by weight of a borosilicate glass dopant, the dopant having a calculated composition of about 2.8% $K_2O$, 18.4% $B_2O_3$, and 78.8% $SiO_2$.

TABLE V

| Oxide | 4 | 5 | 6 | 7 |
|---|---|---|---|---|
| $SiO_2$ | 43.04 | 44.63 | 46.13 | 47.62 |
| $Al_2O_3$ | 37.7 | 37.3 | 37.0 | 36.6 |
| CaO | 14.52 | 10.74 | 7.10 | 3.52 |
| MgO | 2.6 | 5.15 | 7.65 | 10.14 |
| $As_2O_3$ | 0.5 | 0.5 | 0.5 | 0.5 |
| $B_2O_3$ | 0.552 | 0.552 | 0.552 | 0.552 |
| $K_2O$ | 0.084 | 0.084 | 0.084 | 0.084 |
| $Nb_2O_5$ | 1.00 | 1.00 | 1.00 | 1.00 |
| A/C ratio | 0.8/0.2 | 0.6/0.4 | 0.4/0.6 | 0.2/0.8 |

Ceramic matrix composites are prepared incorporating these matrix materials following the procedure used to provide the composites of Examples 1-3 above. Each of the composites contains 10 % (wt) of SC-9 silicon carbide whiskers and, when completely consolidated in nitrogen at 1250° C. and 1500 psi, approximately 35% (volume) of Nicalon ® fibers as the fiber reinforcement.

Physical property data on the ceramic matrix composites made from the above matrix compositions as above described are reported in Table VI below. Included in Table VI for each of the compositions reported are the microcrack stresses ($\sigma$MCY) and elongations ($\epsilon$MCY) at three temperatures, as well as the ultimate stresses ($\epsilon$ULT) and elongations ($\epsilon$ULT) at those temperatures. The anorthite cordierite ratios are also given.

TABLE VI

| Composite Matrix | Test Temp. (°C.) | $\delta$MCY (Ksi) | $\epsilon$MCY (%) | $\delta$ULT (Ksi) | $\epsilon$ULT (%) | A/C Ratio |
|---|---|---|---|---|---|---|
| 4 | 25° | 50 | 0.27 | 95 | 0.63 | 0.8/0.2 |
|   | 1000° | 47 | 0.31 | 58 | 0.40 |   |
|   | 1200° | 13 | 0.13 | 75 | 1.00 |   |
| 5 | 25° | 50 | 0.25 | 104 | 0.66 | 0.6/0.4 |
|   | 1000 | 50 | 0.32 | 58 | 0.38 |   |
|   | 1200° | 12 | 0.12 | 76 | 0.98 |   |
| 6 | 25° | 65 | 0.29 | 78 | 0.38 | 0.4/0.6 |
|   | 1000° | 67 | 0.42 | 83 | 0.54 |   |
|   | 1200° | 8.1 | 0.07 | 86 | 1.03 |   |
| 7 | 25° | 51 | 0.23 | 124 | 0.88 | 0.2/0.8 |
|   | 1000° | 54 | 0.32 | 66 | 0.41 |   |
|   | 1200° | 14 | 0.12 | 79 | 0.87 |   |

Analysis of the strength data shown in Table VI again indicates excellent height temperature performance in the composites tested. One trend which is seen, particularly at the lower cordierite levels, is an increase in high temperature flexural strength as the fraction of cordierite increases. This may be attributable to the somewhat higher elastic modulus of the cordierite phase (19 Msi versus 13 Msi for anorthite) which perhaps improves load transfer by the matrix to the reinforcing fibers. However, in this respect the optimum ratio appears to be 0.4/0.6 (anorthite/cordierite) since Example 7 did not appear to follow this trend.

As previously noted, it is not necessary to melt the glass for the matrix glass-ceramic and the dopant glass together as a single glass composition; rather the dopant glass can constitute a simple mill addition to the powdered matrix material. The following Example illustrates this practice.

EXAMPLE 8

A glass having an oxide composition, in weight percent, of about 40.8% $SiO_2$, 39.7% $Al_2O_3$, 19.0% CaO, 0.5% As and 1% $Nb_2O_5$, is melted and milled to a glass powder of approximately 10 $\mu$m average particle size. To the resulting powdered glass are added a powdered borosilicate glass as a matrix dopant and about 10% by weight of Arco SC-9 whiskers, the glass dopant constituting about 4% by weight and the whiskers about 10% by weight of the mixture. The borosilicate glass dopant has a composition, in weight percent, of about 2.8% $K_2O$, 78.8% $SiO_2$ and 18.4% $B_2O_3$.

Following the procedure of Examples 1-3 above the resulting mixture is blended by ball-milling, incorporated into a flowable aqueous slurry, combined with a silicon oxycarbide yarn, and finally consolidated at 1300° C. and 1500 psi to provide a dense consolidated ceramic matrix composite.

The composite thus provided is tested in four-point bending for physical properties as above described. The results of this testing are reported in Table VII below, including the microcrack and ultimate stresses and sample elongations at three different temperatures as reported above in Table VI.

TABLE VII

| Temperature (°C.) | Composite Properties | | | |
|---|---|---|---|---|
|   | $\sigma$MCY (ksi) | $\epsilon$MCY (%) | $\sigma$ULT (ksi) | $\epsilon$ULT (%) |
| 25° | 58 | 0.31 | 64 | 0.36 |
| 1000° | 30 | 0.19 | 69 | 0.46 |
| 1200° | 14 | 0.13 | 75 | 0.83 |

Again, excellent ultimate strength at elevated temperatures is observed.

As previously noted, the effect of the addition of a glass dopant in accordance with the invention will vary somewhat depending upon the thermal properties of the glass selected. Further, some composite systems yield greater properties improvements with a glass of a relatively high viscosity, while others require a glass of a somewhat lower viscosity for best results.

The thermal properties of the glass are readily controlled by adjusting the composition thereof in the known manner. In general, the high temperature viscosity of silicate glasses can be modified by raising or lowering the levels of boric oxide or alkali metal oxides in the glasses. Thus harder (higher viscosity) glasses result from the reduction of $K_2O$ or $B_2O_3$ levels, or from the removal of these constituents from the composition.

The optimum glass for any system can be identified by routine experiment. Typically, however, the best glass will be the hardest or stiffest glass (the glass with the highest viscosity) available which will achieve the necessary resistance to high temperature embrittlement in the selected composite system. This glass will achieve the best balance between resistance to oxidation embrittlement and resistance to creep at high temperatures.

The following Examples illustrate in further detail some of the effects of varying glass dopant composition in a ceramic matrix composite system wherein barium-stuffed cordierite constitutes the principal crystalline phase.

EXAMPLES 9-12

Glasses for a series of matrix compositions are compounded, melted, and formed into glass powders suitable for incorporation into ceramic matrix composites. The compositions prepared include constituents for a borosilicate glass dopant, at concentrations of 2.5% and 5% by weight of the matrix. However, the levels of alkali metal oxide (in this case $K_2O$) and boron are varied in the compositions to achieve variations in the composition and high-temperature viscosity of the glass dopant, which is developed in the preferred manner as a residual glass phase in the course of crystallization of the final composites.

Table VIII below sets forth compositions for these glasses, together with the compositions on which they are based. The base compositions correspond to composition Examples 1 and 2 in Table II above. The compositions in the Table are reported in parts by weight on the oxide basis, and the weight percent of glass dopant batched for each composition is also given.

TABLE VIII

| Oxide | 1 | 9 | 10 | 2 | 11 | 12 |
|---|---|---|---|---|---|---|
| $SiO_2$ | 43.98 | 43.98 | 44.35 | 44.85 | 44.85 | 45.61 |
| $Al_2O_3$ | 35.57 | 35.57 | 35.34 | 34.65 | 34.65 | 34.25 |
| MgO | 12.4 | 12.4 | 12.32 | 12.08 | 12.08 | 11.94 |
| BaO | 5.90 | 5.90 | 5.88 | 5.757 | 5.757 | 5.69 |
| $Nb_2O_5$ | 0.978 | 0.978 | 0.9623 | 0.9531 | 0.953 | 0.932 |
| $B_2O_3$ | 0.4892 | 0.4892 | 0.4811 | 0.9531 | 0.953 | 0.932 |
| $As_2O_3$ | 0.655 | 0.655 | 0.64 | 0.638 | 0.638 | 0.62 |
| $K_2O$ | 0.074 | — | — | 0.1448 | — | — |
| Glass Dopant | 2.5% | 2.5% | 2.5% | 5.0% | 5.0% | 5.0% |

The desired increases in high temperature glass viscosity in the glass dopant in these compositions is achieved, first by removing the alkali metal oxide constituent (Examples 9 and 11), and then by decreasing the ratio of $B_2O_3$ to $SiO_2$ in the compositions (Examples 10 and 12).

Ceramic matrix composites are prepared from the compositions reported in Table VIII in the manner described in Examples 1-3. The composites comprise silicon oxycarbide fiber reinforcement and 10% by weight of SC-9 silicon carbide whiskers. The composite products thus produced are then tested for physical properties in the manner described in previous examples, with the results set forth in Table IX below. Included in Table IX for comparison are the test data for Examples 1 and 2 previously shown above in Table III.

TABLE IX

| | Physical Properties | | | | |
|---|---|---|---|---|---|
| Composite | Temperature (°C.) | σMCY (Ksi) | εMCY (%) | σULT (Ksi) | εULT (%) |
| Ex. 1 | 25° | 64 | 0.28 | 125 | 0.75 |
| | 1000° | 32 | 0.23 | 95 | 0.75 |
| | 1200° | 32 | 0.34 | 90 | 1.08 |
| Ex. 9 | 25° | 63 | 0.31 | 139 | 0.98 |
| | 1000° | 43 | 0.25 | 59 | 0.35 |
| | 1200° | 13 | 0.13 | 75 | 0.81 |
| Ex. 10 | 25° | 61 | 0.27 | 104 | 0.63 |
| | 1000° | 42 | 0.25 | 77 | 0.53 |
| | 1200° | 14 | 0.12 | 70 | 0.80 |

TABLE IX-continued

| | Physical Properties | | | | |
|---|---|---|---|---|---|
| Composite | Temperature (°C.) | σMCY (Ksi) | εMCY (%) | σULT (Ksi) | εULT (%) |
| Ex. 2 | 25° | 76 | 0.33 | 132 | 0.77 |
| | 1000° | 28 | 0.19 | 120 | 0.96 |
| | 1200° | 18 | 0.16 | 105 | 1.2 |
| Ex. 11 | 25° | 27 | 0.13 | 92 | 0.49 |
| | 1000° | 30 | 0.19 | 106 | 0.79 |
| | 1200° | 13 | 0.13 | 90 | 1.23 |
| Ex. 12 | 25° | 67 | 0.33 | 119 | 0.72 |
| | 1000° | 22 | 0.15 | 50 | 0.40 |
| | 1200° | 10 | 0.09 | 77 | 0.91 |

The data in Table IX indicate that, while the exact viscosity of the dopant glass is not critical, an optimum viscosity in terms of the ultimate physical properties of the composites can be achieved, depending on the particular combination of properties required for the composite.

In the case of the composition shown in Tables VIII and IX, better results are achieved for the lower viscosity glass composition at the particular glass doping levels employed. At even lower viscosities, however, it is expected that the doped matrix would not effectively transfer stress to the fibers, and thus the composite strength and creep resistance would be anticipated to decline. At very high stiffness, on the other hand, the glass might not flow enough to blunt microcracks and/or otherwise prevent oxidation embrittlement.

EXAMPLES 13-15

A series of matrix compositions in the anorthite glass-ceramic composition system is prepared to determine the effects of dopant glass viscosity on the physical properties of composites in that system. Table X below sets forth a series of three matrix formulations, each of calcium aluminosilicate composition and each crystallizable to yield an anorthite glass-ceramic comprising a residual borosilicate glass dopant phase. As in the case of the compositions reported in Table VIII, the viscosity of the residual dopant glass in these matrix materials is again increased by, first, removing $K_2O$ from the formulation and then by decreasing the ratio of $B_2O_3$ to $SiO_2$ therein.

TABLE X

| | Doped Anorthite Matrices | | |
|---|---|---|---|
| Composition | 13 | 14 | 15 |
| $SiO_2$ | 42.4 | 42.5 | 43.26 |
| $Al_2O_3$ | 37.29 | 37.34 | 36.85 |
| CaO | 17.73 | 17.76 | 17.52 |
| $Nb_2O_5$ | 0.95 | 0.950 | 0.937 |
| $As_2O_3$ | 0.474 | 0.475 | 0.4689 |
| $B_2O_3$ | 0.9587 | 0.960 | 0.947 |
| $K_2O$ | 0.1463 | — | — |

Fiber-reinforced composites are prepared from these matrix materials, again incorporating Nicalon ® silicon oxycarbide fibers and 10% by weight of SC-9 silicon carbide whiskers. The manufacturing procedures of Examples 1-3 are followed, with the composite preforms being consolidated by hot-pressing at 1300° C. and 1500 psi.

Composites produced as described are tested for physical properties in four-point bending with the results set forth in Table XI below. Included in Table XI for each of the samples tested are microcrack and ultimate stress and elongation values at ambient temperature and at two elevated temperatures.

TABLE XI

| Composite | Temperature (°C.) | Physical Properties | | | |
|---|---|---|---|---|---|
| | | σMCY (Ksi) | εMCY (%) | σULT (Ksi) | εULT (%) |
| Ex. 13 | 25° | 45 | 0.25 | 82 | 0.48 |
| | 1000° | 45 | 0.29 | 46 | 0.31 |
| | 1200° | 16 | 0.16 | 66 | 0.74 |
| Ex. 14 | 25° | 63 | 0.32 | 80 | 0.44 |
| | 1000° | 34 | 0.21 | 54 | 0.34 |
| | 1200° | 15 | 0.14 | 66 | 0.62 |
| Ex. 15 | 25° | 58 | 0.30 | 92 | 0.55 |
| | 1000° | 58 | 0.34 | 62 | 0.36 |
| | 1200° | 17 | 0.17 | 74 | 0.80 |

In this series of compositions it is found that the high-temperature strengths of the materials increase with increasing dopant viscosity, and again optimization of the viscosity of the dopant would allow maximization of the high temperature properties of the composites. The reasons for the differences in behavior observed when shifting to this system from the barium-stuffed cordierite compositions of Table VIII are not fully understood, although the somewhat lower elastic modulus of these matrices and/or chemical effects due to the differences in matrix composition may play a role. In addition, of course, process variables such as hot press temperature and pressure are well known to affect the physical properties of ceramic matrix composites generally.

As previously indicated, while simple ternary borosilicate glasses represent a preferred class of materials exhibiting the temperature-viscosity characteristics needed for good performance as a matrix dopant in accordance with the invention, other more complex glasses exhibiting relatively flat viscosity temperature curves at high temperatures may alternatively be employed. In one case, illustrated by the following example, an alkaline earth boroaluminosilicate glass dopant is used.

EXAMPLE 16—Alternative Dopant

A glass for a glass-ceramic matrix composition comprising anorthite as the principal crystal phase is formulated, melted, and converted to a glass powder. The glass powder has a composition, in weight percent, of about, 40.8% $SiO_2$, 39.7% $Al_2O_3$, 19.0% CaO, 0.5% $As_2O_3$ and 1.0% $Nb_2O_3$, and has an average particle size of about 10 μm.

To 98 parts by weight of this powdered glass are added 2 parts by weight of a powdered boroaluminosilicate glass dopant having a composition, in weight percent, of about 58% $SiO_2$, 15% $Al_2O_3$, 7% MgO, 10% CaO, 6% BaO, 4% $B_2O_3$, and 0.5% $As_2O_3$. The two glasses are blended by ball-milling in an isopropanol vehicle for one hour, and the blend is then separated from the vehicle by filtration.

A ceramic matrix composite comprising Nicalon® silicon oxycarbide fibers and 10% of SC-9 SiC whiskers by weight is next prepared from this matrix mixture following the procedure of Examples 1-3 above. Consolidation is at 1300° C. and 1500 psi.

The glass-doped composite produced as described is tested for physical properties in four-point bending as earlier described, with the results being set fourth in Table XII below.

TABLE XII

| Temperature (°C.) | Physical Properties | | | |
|---|---|---|---|---|
| | σMCY (Ksi) | εMCY (%) | σULT (Ksi) | εULT (%) |
| 25° | 40 | 0.22 | 60 | 0.42 |
| 1000° | 41 | 0.27 | 48 | 0.32 |
| 1200° | 9.0 | 0.10 | 68 | 0.82 |

As is evident from the data set forth in the Table, this composite again exhibits good high temperature properties. It is postulated that, by combining the dopant glass with the matrix glass as a mill additive, the dopant glass may be retained as an effective intergranular glass modifying phase despite its compositional similarity with the matrix glass. Very probably a glass of this exact composition could not be successfully separated from these matrix compositions during matrix crystallization, as was achieved with simpler $Al_2O_3$-free borosilicate glass dopant compositions in previous examples.

The selection of whiskers to be utilized in the fabrication of composites to be provided in accordance with the invention can also affect the results which are obtained. Generally, it appears that whiskers of larger diameter as well as whiskers of higher aspect ratio offer measurable performance advantages in glass-doped composite systems.

In a typical case, the use of whiskers such as Tokamax ™ SiC whiskers, which are of smaller diameter and aspect ratio than the SC-9 whiskers utilized in many of the previous examples, provide composites of noticeably lower maximum strength at ambient and elevated temperatures. However, the composites still offer excellent resistance to fatigue at high temperatures, as well as complete resistance to strength deterioration during high temperature thermal fatigue testing.

It is possible to provide glass-doped composites omitting the whisker component if desired. The following examples provide an illustration of the manufacture and testing of such composites.

EXAMPLES 17-18—Whisker-Free Composites

A glass for a glass-ceramic matrix composition comprising anorthite as the principal crystal phase, having the composition of the matrix glass of Example 16 above, is formulated, melted, and converted to a glass powder. Also prepared is a glass powder for a glass dopant having the composition of the alkaline earth boroaluminosilicate glass dopant described in Example 16.

The two glasses are mixed to provide two matrix batches, a first in the proportion of 2% glass dopant and 98% matrix glass and a second in the proportion of 4% glass dopant and 96% matrix glass. No whiskers are added to these batches; instead they are simply blended by ball-milling in an isopropanol vehicle for one hour, and then separated from the vehicle by filtration.

Ceramic matrix composites comprising Nicalon® silicon oxycarbide fibers are next prepared from each of these matrix mixtures following the procedure of Examples 1-3 above. Consolidation is at 1300° C. and 1500 psi.

The glass-doped composites produced as described are tested for physical properties in four-point bending as earlier described, with the results being set fourth in Table XIII below.

TABLE XIII

| Composite | Temperature (°C.) | δMCY (Ksi) | εMCY (%) | δULT (Ksi) | εULT (%) |
|---|---|---|---|---|---|
| Ex. 17 | 25° | 38 | 0.20 | 88 | 0.57 |
| (2% glass) | 1000° | 50 | 0.32 | 65 | 0.40 |
|  | 1200° | 16 | 0.14 | 64 | 0.61 |
| Ex. 18 | 25° | 40 | 0.22 | 86 | 0.73 |
| (4% glass) | 1000° | 49 | 0.33 | 59 | 0.42 |
|  | 1200° | 17 | 0.17 | 71 | 0.87 |

As is evident from a study of the data set forth in Table XIII, good ambient and high-temperature properties may be obtained in glass-doped composites without adding whiskers. It is expected, however, that somewhat lower resistance to high temperature creep will be observed in these systems. Therefor, where minimum use temperatures of at least 900° C. to 1000° C. will be required, whiskers will constitute an essential component of the glass-doped composite.

The improvements in properties achievable in accordance with the invention as above described require that the proportion of glass and/or modifying species such as boron in the glass be limited. Excessive additions appear to degrade not only the high temperature creep resistance of the products, but also the ambient temperature performance as well as the thermal stability thereof.

To demonstrate these effects, a composite product is prepared as in Examples 1-3 above, but the level of glass doping is increased to about 19% by weight of the matrix. This doping level provides a boron concentration of approximately 3.5% by weight in the matrix. The matrix thus has an approximate composition, in weight percent, of about 49.62% $SiO_2$, 29.45% $Al_2O_3$, 10.34% MgO, 4.9% BaO, 3.5% $B_2O_3$, 0.532% $K_2O$, 1.0% $Nb_2O_5$, and 0.6% $As_2O_3$.

When processed by hot pressing at 1300° C. to achieve the highest strength composite, this product shows no microcrack yield point but instead exhibits sudden catastrophic failure at a stress level of about 42 ksi, at a sample elongation of about 0.21%. Hence very little strength and essentially no composite toughness is shown.

Similarly, the addition of $B_2O_3$ alone to these alkaline earth aluminosilicate matrix systems to achieve good high temperature performance is found to be relatively ineffective. This is presently ascribed in part to the harmful effects of developing an intergranular glass phase by extraction of silica and other glass components from matrix, without compensating for such extraction in the matrix formulation to maintain the desired crystal composition.

In one illustrative example, a matrix glass is formulated to provide a barium-stuffed cordierite glass-ceramic matrix, but with an oxide addition of about 1% by weight of $B_2O_3$ The matrix glass thus has an approximate composition, in weight percent, of about 42.8% $SiO_2$, 36.36% $Al_2O_3$, 12.68% MgO, 6.04% BaO, 1.00% $Nb_2O_5$, 0.67% $As_2O_3$ and 1.00% $B_2O_3$.

A composite is prepared using this matrix material, incorporating about 15 wt. % of SC-9 silicon carbide whiskers and a reinforcing phase consisting of Nicalon ® silicon oxycarbide fibers, following the fabrication procedures of Examples 1-3.

Initially, the resulting composite appears to exhibit good microcrack yield and ultimate strengths at 1000° C., with values of 17 ksi and 75 ksi, respectively, being recorded. However, subsequent testing of the composite after thermal aging for only 24 hours at 1000° C. indicates that this composite is not sufficiently stable for use at such temperatures. Hence, the initial room temperature MCY and ultimate strength values are reduced by this brief aging treatment to about 13 ksi and 43 ksi, respectively, at 1000° C.

Accordingly it has been concluded that, for alkaline earth aluminosilicate matrix systems, the dopant should consist of a borosilicate glass, rather than a simple oxide or other dopant, and both the glass content and the boron content of the matrix should be suitably limited. As indicated above, the amount glass dopant will be limited to about 12% by weight of the matrix, and the amount of boron introduced with the glass dopant will be so limited that not more than about 2.5% by weight of boron, based on the total weight of the glass-ceramic matrix, will be present. These limitations will not only effectively enhance thermal stability, but will also avoid possible adverse effects on high temperature physical properties in these composites.

As is evident from the foregoing description, then, composites provided in accordance with the invention offer substantial performance advantages over composites known in the prior art. Particularly significant is the capability of these composites to withstand prolonged exposure to a high-temperature oxidizing environment while under stresses significantly above the microcrack stress point of the material. Further, these composites typically show higher strains (elongations) to failure at elevated temperatures than conventional composites, due to the presence of the matrix-modifying glass dopant phase therein.

Composites provided in accordance with the invention also offer the possibility of greatly improved service life under cyclic stress above the microcrack stress point at high temperatures. This is attributable to the resistance of the composites to actual microcracking at high temperatures, due to crack blunting or microdeformation of the glass-doped matrix phase.

In addition, the presence in the matrix formulation of an added glass component, whether included as an integral component of the matrix glass or incorporated as a mill additive to the matrix selected, will generally offer a noticeable processing advantage, particularly where high whisker loadings are employed. This will be due to the improved flow and consolidation characteristics of the selected matrix stemming from the incorporation of a stable glass-forming dopant phase therein.

Of course, it is also evident that the practices and procedures hereinabove described are applicable to ceramic matrix composite systems other than those embodying the preferred combinations of alkaline earth aluminosilicate matrices and silicon carbide or oxycarbide whiskers and fibers. Thus, while the invention has been particularly described above with respect to specific materials and specific procedures, it will be recognized that those materials and procedures are presented for purposes of illustration only and are not intended to be limiting. Obviously, therefore, numerous modifications and variations upon the compositions and processes specifically described herein may be resorted to by those skilled in the art within the scope of the appended claims.

I claim:
1. A ceramic matrix composite article comprising:
  a crystalline glass-ceramic matrix wherein alkaline earth aluminosilicate crystals constitute the principal crystal phase;

a fiber reinforcing phase composed of a multiplicity of inorganic fibers disposed within the glass-ceramic matrix; and a borosilicate glass phase disposed as an intergranular glass within the glass-ceramic matrix; the borosilicate glass phase being present in a proportion constituting from 1-12% by weight of the total weight of the matrix.

2. A ceramic matrix composite in accordance with claim 1 wherein the concentration of $B_2O_3$ in the composite does not exceed about 2.5% by weight of the total weight of the glass-ceramic matrix.

3. A ceramic matrix composite in accordance with claim 2 which further comprises, in addition to the fiber reinforcing phase, a whisker reinforcing phase consisting of a multiplicity of inorganic whiskers disposed in the glass-ceramic matrix.

4. A ceramic matrix composite in accordance with claim 3 wherein the inorganic whiskers are silicon carbide whiskers, and wherein the whiskers are present in a proportion constituting 1-15% by weight of the total weight of the matrix.

5. A ceramic matrix composite in accordance with claim 4 wherein the inorganic fibers comprise silicon oxycarbide fibers and wherein the silicon oxycarbide fibers constitute 30-50% by volume of the composite.

6. A ceramic matrix composite in accordance with claim 5 wherein the glass-ceramic matrix comprises a predominant crystal phase selected from the group of anorthite ($CaO.Al_2O_3.2SiO_2$) and its pseudo-binaries with mullite ($3Al_2O_3.SiO_2$), cordierite ($2MgO.2Al_2O_3.5SiO_2$), barium osumilite ($BaO.2MgO.3Al_2O_3.9SiO_2$), albite solid solution ($Na_2O.Al_2O_3.6SiO_2$), $Al_2O_3$, $SiO_2$, $CaO.SiO_2$, and gehlenite ($2CaO.Al_2O_3.SiO_2$), and wherein the matrix has a composition consisting essentially, in weight percent, of about 0-25% CaO, 0-30% SrO, 10-30% CaO+SrO, 0-15% MgO, 0-25% BaO, 0-4% $Na_2O$, 0-6% $K_2O$, 25-38% $Al_2O_3$, 35-60% $SiO_2$, 0-15% $ZrO_2$, 0-3% $As_2O_3$, 0-30% total of BaO+MgO+$Na_2O$+$K_2O$+$TiO_2$+$ZrO_2$+$As_2O_3$, and 0-10% total of nucleating agents selected in the indicated proportion from the group consisting of 0.1-3% $Cr_2O_3$, 0.25-3% $HfO_2$, 2-5% $MoO_3$, 0.25-3% $Nb_2O_5$, 0.25-3% $Ta_2O_5$, and 0.25-3% $WO_3$.

7. A ceramic matrix composite in accordance with claim 5 wherein the glass-ceramic matrix comprises a predominant crystal phase of triclinic anorthite in solid solution with at least one of mullite and alpha alumina, and wherein the matrix has a composition consisting essentially, in weight percent, of about 16-20% CaO, 38.5-46% $Al_2O_3$, 35-42% $SiO_2$, 0.25-1.5% $As_2O_3$, and up to 10% total nucleating agent selected in the indicated proportion from the group consisting of 0.1-3% $Cr_2O_3$, 0.25-3% $HfO_2$, 2-5% $MoO_3$, 0.25-3% $Nb_2O_5$, 0.25-3% $Ta_2O_5$, 0.25-3% $WO_3$, and 1-10% $ZrO_2$, the composition being substantially free of $TiO_2$ and containing $Al_2O_3$ in an amount which is at least 10 mole percent and up to 50 mole percent in excess of that present in stoichiometric triclinic anorthite.

8. A ceramic matrix composite in accordance with claim 5 wherein the glass-ceramic matrix comprises a predominant crystal phase selected from the group consisting of barium osumilite, cordierite, and stuffed cordierite, and wherein the matrix has a composition consisting essentially, in weight percent, of about 35-60% $SiO_2$, 17-40% $Al_2O_3$, 5-15% MgO, 1-18% total of one or more oxides of stuffing species selected from the group consisting of BaO, CaO, SrO and $Cs_2O$, 0-5% $Nb_2O_5$, 0-10% $Ta_2O_5$, 0-6% $ZrO_2$, 0-1% Si, 0-3% $As_2O_3$ and 0-10% ZnO.

9. A ceramic matrix composite in accordance with claim 5 wherein the glass-ceramic matrix comprises 0.1-5% by weight of $Nb_2O_5$.

10. A method for increasing the use temperature of a ceramic matrix composite comprising an alkaline earth aluminosilicate glass-ceramic matrix and a silicon carbide fiber reinforcing phase which comprises the step of introducing a borosilicate glass into the composite matrix composition in a proportion sufficient to provide an intergranular glass phase in the glass-ceramic matrix of the composite.

11. A method in accordance with claim 10 wherein the borosilicate glass contains 1-30% $B_2O_3$ by weight, and wherein the intergranular glass phase constitutes 1-12% by weight of the total weight of the glass-ceramic matrix.

12. A method in accordance with claim 11 wherein the concentration of $B_2O_3$ in the composite does not exceed about 2.5% by weight of the glass-ceramic matrix.

13. A method in accordance with claim 12 wherein the borosilicate glass is introduced into the composite by the step of mixing the borosilicate glass with a powdered glass precursor for the glass-ceramic matrix.

14. A method in accordance with claim 12 wherein the borosilicate glass is introduced into the composite by a process comprising the steps of:
melting the components for the borosilicate glass together with the components for the glass-ceramic matrix of the composite as a single glass; and
concurrently developing aluminosilicate crystals in the glass-ceramic matrix and an intergranular glass phase disposed within the matrix by a thermal nucleation and crystallization heat treatment of the single glass.

15. A method in accordance with claim 14 which comprises the further step of introducing silicon carbide whiskers into the glass-ceramic matrix in a proportion of about 1-15% by weight of the matrix.

* * * * *

UNITED STATES PATENT AND TRADEMARK OFFICE
CERTIFICATE OF CORRECTION

PATENT NO.    : 5,284,806
DATED         : February 8, 1994
INVENTOR(S)   : Kishor P. Gadkaree It is certified that error appears in the above-identified patent and that said Letters Patent is hereby corrected as shown below:

Col. 1, line 12, insert "." after "phases"

Col. 2, line 63, "SiO" should be "$SiO_2$"

Col. 3, line 53, after "tion" insert "modification which permits slight plastic deformation of"

Col. 4, line 51, "oil" should be "of"

Col. 5, lines 42-43, "$(CaO.Al_2-Si_2)$" should be "$(CaO.Al_2O_3.2SiO_2)$"

Col. 5, line 43, "$(3Al_2O_3.Si_2)$" should be "$(3Al_2O_3.SiO_2)$"

Col. 5, line 45 "$(BaO.2MgO.3Al_2O_3.9SiO_2)$" should be "$(BaO.2MgO.3Al_2O_3.9SiO_2)$"

Col. 5, line 46, "$(Na_2O.Al_2O_3.6Si_2)$" should "$(Na_2O.Al_2O_3.6SiO_2)$"

Col. 5, line 47, insert "." after ")"

Col. 10, line 15, before "850" insert "Tamol$^{TM}$"

Col. 11, line 16, after "illustrates" insert "the"

Col. 13, line 30, 1st occurrence "( ULT)" should be "( ULT)"

UNITED STATES PATENT AND TRADEMARK OFFICE
CERTIFICATE OF CORRECTION

PATENT NO. : 5,284,806

DATED : February 8, 1994

INVENTOR(S) : Kishor P. Gadkaree

It is certified that error appears in the above-identified patent and that said Letters Patent is hereby corrected as shown below:

Col. 14, line 14, "As" should be "$As_2O_3$"

Col. 21, line 52, insert "of at least one" after "total"

Signed and Sealed this

Second Day of August, 1994

Attest:

BRUCE LEHMAN

Attesting Officer    Commissioner of Patents and Trademarks